United States Patent [19]

Mascia et al.

[11] 4,142,653

[45] Mar. 6, 1979

[54] FLEXIBLE BAG PUMP-TYPE DISPENSER FOR MOUNTING ON CANS

[75] Inventors: Carmen T. Mascia, Clarendon Hills; Gary K. Hasegawa, Chicago, both of Ill.

[73] Assignee: The Continental Group, Inc., New York, N.Y.

[21] Appl. No.: 835,345

[22] Filed: Sep. 21, 1977

[51] Int. Cl.[2] ........................ B05B 9/043; B05B 11/04; G01F 11/03

[52] U.S. Cl. .................................... 222/207; 222/325; 222/383

[58] Field of Search ................. 222/82, 207, 211, 212, 222/214, 324, 325, 382, 383, 384, 340

[56] References Cited

U.S. PATENT DOCUMENTS

| | | | |
|---|---|---|---|
| 2,554,570 | 5/1951 | Harvey | 222/207 X |
| 2,735,588 | 2/1956 | Elton | 222/324 |
| 3,514,017 | 5/1970 | Malone | 222/340 X |
| 3,746,261 | 7/1973 | Nozawa et al. | 222/384 X |
| 3,777,945 | 12/1973 | Nozawa et al. | 222/340 X |
| 3,799,448 | 3/1974 | Nozawa et al. | 222/340 X |
| 3,995,774 | 12/1976 | Cooprider et al. | 222/207 |
| 4,033,487 | 7/1977 | Micallef | 222/207 |
| 4,054,205 | 10/1977 | Blow, Jr. | 222/570 X |

FOREIGN PATENT DOCUMENTS

| | | | |
|---|---|---|---|
| 1255531 | 11/1967 | Fed. Rep. of Germany | 222/382 |

*Primary Examiner*—David A. Scherbel
*Attorney, Agent, or Firm*—Charles E. Brown

[57] ABSTRACT

A dispensing device for dispensing the contents of dispensers of the can type. The dispensing device includes a housing which is snapped into engagement with a container upper chime. The housing has a flexible bag therein which is deformable by way of a pivotally mounted lever so that the bag volume may be varied to sequentially draw a product from a container thereinto through a tube and to dispense that product under pressure by way of a valve controlled nozzle.

9 Claims, 4 Drawing Figures

FIG.1
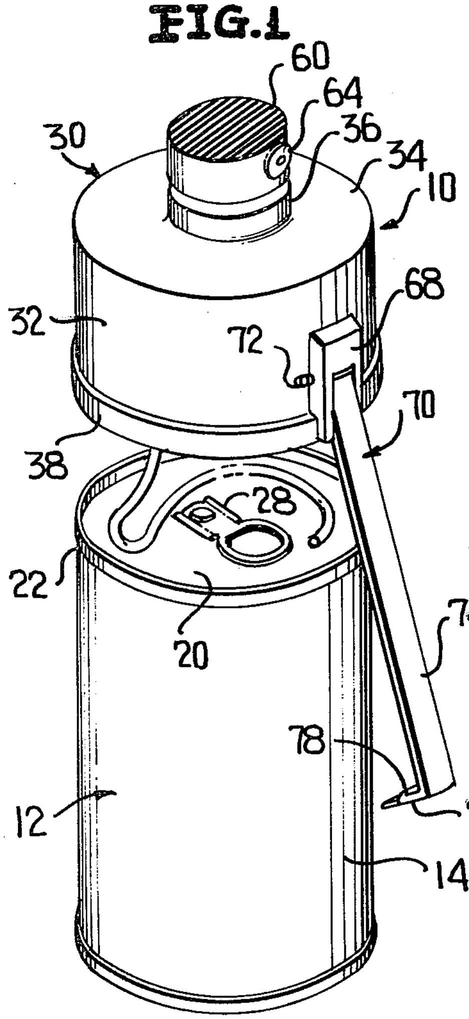
FIG.2
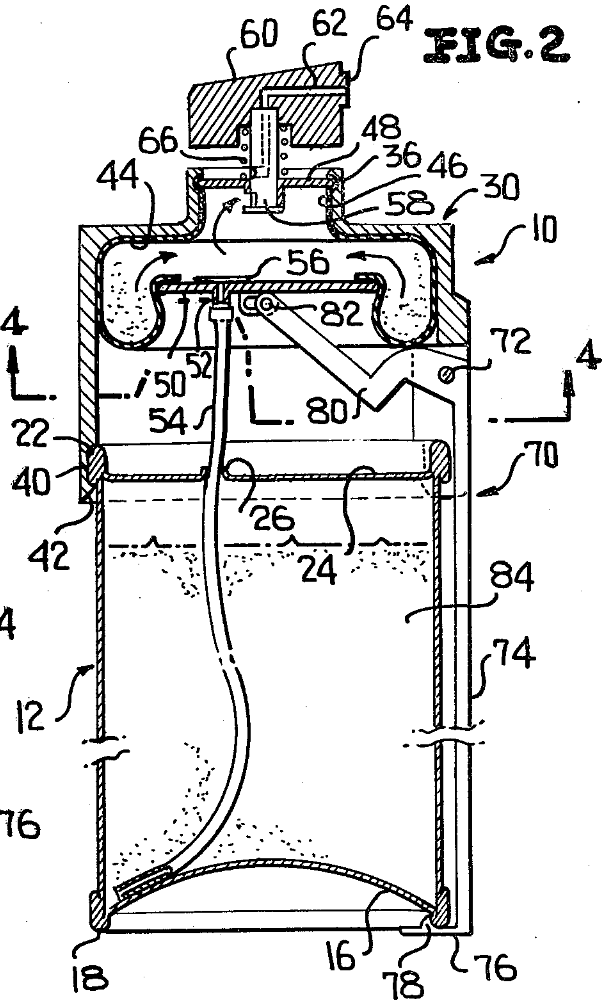
FIG.3
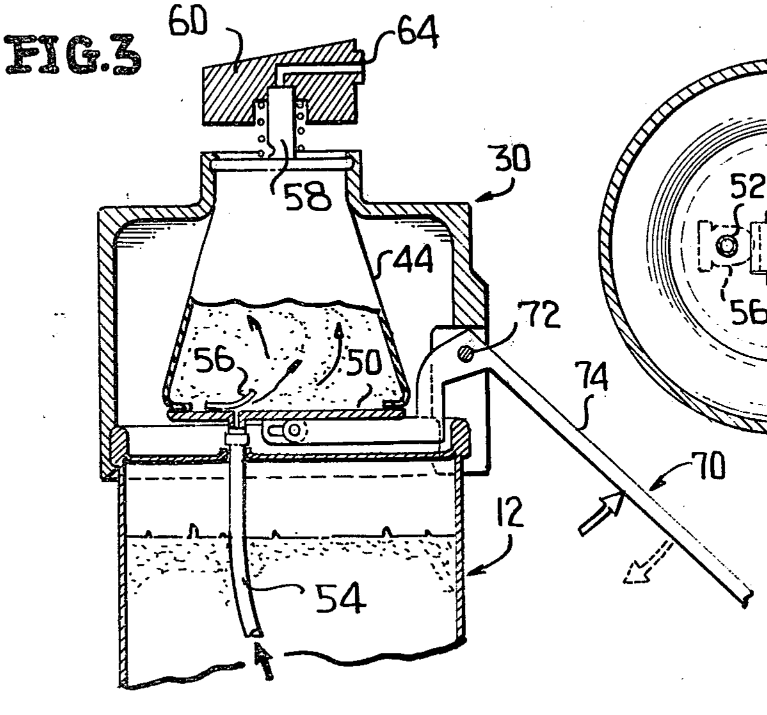
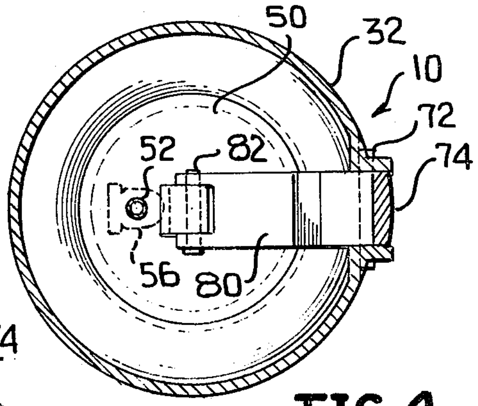
FIG.4

FLEXIBLE BAG PUMP-TYPE DISPENSER FOR MOUNTING ON CANS

This invention relates in general to new and useful improvements in apparatus for dispensing products of containers of the can type, and more particularly to a separately formed dispensing device which may be readily interlocked with a can having an easy opening type end for the purpose of dispensing the contents of the can.

Although at present many liquid products are dispensed by way of aerosol type containers, it has been ascertained that the propellant gas is harmful to the ecology and efforts therefore are being made to eliminate such types of dispensing containers. For long periods of time containers of the bottle type have been provided with pump mechanisms. These pump mechanisms, however, have the deficiency in that they dispense the product only during the pumping action, and therefore are not suitable for many types of uses. In the past there have been different pump assemblies to be associated with containers, but wherein either there is a direct pumping action or wherein the pump pumps air into the container internally to pressurize the container. Typical of such prior patents are U.S. Pat. Nos. 3,173,584 to Giavasis; 3,726,442 to Davidson et al; and 3,995,774 to Cooprider et al.

In accordance with this invention it is proposed to provide a dispensing device which is readily interlockable with the upper chime of a conventional can with the dispensing device including a housing for mounting therein a variable volume enclosure in the form of a flexible bag, there being carried by the housing and connected to the bag a lever-type actuator. The bag is provided with an inlet tube which passes into the container through an opening in the end wall thereof and carried by the bag at the top thereof is a dispensing valve including a dispensing nozzle wherein the product drawn into the bag and placed under pressure therein may be sprayed or otherwise dispensed in the customary manner by merely depressing the nozzle to open the dispensing valve.

Another feature of the invention is the construction and mounting of the lever actuator so that the handle portion thereof may be interlocked with a bottom end of the associated can, thus retaining the bag in its collapsed product pressurizing position.

A further feature of the invention is its adaptability to cans having easy opening ends.

A further feature of the pump is the formation of the bag of a resilient stretchable material which permits the bag to continue to dispense a product over a period of time even though the lever actuator is in a fixed position.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a top exploded perspective view showing the dispensing device in spaced position with respect to a container particularly adapted for receiving the dispensing device.

FIG. 2 is a vertical sectional view taken through the interlocked dispensing device and container with the dispensing device being in product dispensing position.

FIG. 3 is a fragmentary vertical sectional view through the upper part of the container and dispensing device with the dispensing device being in a bag-expanding position with the bag receiving the product from the container.

FIG. 4 is a horizontal sectional view taken generally along the line 4—4 of FIG. 2 and shows generally the relationship of the bag and the lever actuator.

Referring now to the drawings in detail, it will be seen that there is illustrated a dispensing device which is the subject of this invention, the dispensing device being generally identified by the numeral 10. The dispensing device is particularly adapted for use with a container of the easy opening type, the illustrated container being generally identified by the numeral 12. The container 12 includes a body 14 having a bottom end 16 which may be separately or integrally formed but being recessed with respect to the lower end of the body so as to define an annular projection 18, as is best shown in FIG. 2.

The container 12 has an upper end unit 20 which is secured to the body 14 by means of a conventional double seam 22 which projects outwardly from the body 14 and defines an upper chime. The end unit 20 includes an end panel 24 with a dispensing opening 26 preferably preformed therein. The dispensing opening 26 will normally be closed by a removable tear strip member 28.

The dispensing device 10 includes a housing, generally identified by the numeral 30. The housing 30 includes a cylindrical body 32 and an end wall 34 which may have an upwardly directed neck 36. The body 32 may be reinforced at its lower edge as at 38 and has formed on the inner surface thereof (FIG. 2) an annular recess 40 for receiving the double seam or chime 22. The housing 30 is preferably formed of a resilient plastics material and the lower end thereof is bevelled as at 42 on the inner surface to facilitate the snap engagement of the housing over the can end.

The housing 30 has mounted therein a flexible bag 44 which is formed of a suitable stretchable material, preferably one which may be economically formed, such as many of the known rubber-like plastics materials. The construction of the bag 44 may vary, but in the preferred embodiment of the invention, an upper end portion 46 of the bag is locked to the housing 30 within the neck 36 by a top closure 48. The lower end of the bag 44 includes a plate 50 which is rigid and which has depending therefrom a fitting 52 over which an upper end of a supply tube 54 is telescoped. The fitting 52 has an aperture therethrough which is normally closed by a flap valve 56.

The closure 48 is provided with the customary dispensing valve 58 and the dispensing valve 58 is provided with an actuator 60 having a dispensing passage 62 therethrough in communication with the valve 58 and preferably terminating in a nozzle 64. The actuator 60 and the valve 58 are constantly urged to a valve closing position by means of a spring 66.

The body 32 of the housing 30 is provided with a projection 68 in which there is mounted an intermediate portion of a lever actuator, generally identified by the numeral 70. The lever actuator 70 is mounted for pivotal movement relative to the housing 30 by means of a pin 72. The lever actuator 70 includes an elongated handle 74 which depends from the housing and which is provided at the lower end thereof with a flange 76 having on its upper surface a latch 78 for engaging the annular projection 18 in the manner shown in FIG. 2.

The lever actuator 70 also includes an arm 80 disposed within the housing 30 and connected to the plate 50 by means of a pivot pin 82. If desired, the connection between the arm 80 and the plate 50 may include a slot to compensate for the swinging movement of the pivot pin 82 about the pivot pin 72.

As is readily apparent from FIGS. 2 and 3, when the handle 74 is swung upwardly and outwardly relative to the container 12, the bag 44, which forms an enclosure for the product drawn from the can 12, is opened and a vacuum is formed therein so as to draw a product 84 from the container 12 up through the tube 54, the tube 54 having passed down into the container 12 through the aperture 26. Flow continues into the bag 44 until there is a pressure equalization, at which time the resilient flap valve 54 again closes.

When the handle 74 is moved in a clockwise direction so as to move the plate 50 upwardly, the bag 44 is first deformed so as to decrease the volume thereof and, as the plate 50 further moves upwardly, with the normal volume of the bag becoming less than the volume of the product therein, the bag will begin to stretch due to the resiliency of the material thereof and finally assume the form illustrated in FIG. 2 with the shape of the bag in part dictated by the relationship of the bag to the interior of the housing 30.

As is clearly shown in FIG. 2, the handle 74 may be stored alongside the container 12 and the container 12 may be stored in an upright position with the product in the bag 44 under pressure. When it is desired to dispense the product, it is only necessary to depress the actuator 60. As the product is dispensed, the bag 44 will regain its original configuration to the extent that the pressure of the product therein will decrease to the point that improper dispensing will occur. It will then be necessary to utilize the lever actuator 70 to again pump the product from the container into the bag 44 and restretch the bag as described before.

Although only a preferred embodiment of the dispensing device has been specifically illustrated and described, it is to be understood that minor variations may be made in the dispensing device without departing from the spirit and scope of the invention as defined by the appended claims.

What is claimed as new is:

1. A dispensing device for dispensing the contents of containers of the can type having an end unit secured to a body by an upper chime, said dispensing device comprising a housing having attachment means for engaging a container upper chime, a variable volume enclosure carried by said housing, an inlet tube and inlet valve connected to said enclosure for communicating said enclosure with the interior of an associated container when the volume of said enclosure increased, a separately controlled dispensing valve and nozzle unit connected to said enclosure for selectively dispensing a product drawn into the enclosure and placed under pressure therein independently of the pressurizing of a product within said enclosure, and an actuator carried by said housing and coupled to said enclosure for varying the volume of said enclosure to selectively draw in a product and pressurize a drawn in product, said enclosure being in the form of a flexible bag having an upper end fixed relative to said housing and a movable bottom wall for varying the volume of said enclosure.

2. The dispensing device of claim 1 wherein said actuator is connected to said bottom wall for selectively moving said bottom wall away from said bag upper end to elongate said bag and increase the volume thereof and toward said bag upper end to collapse said bag.

3. The dispensing device of claim 1 wherein said housing completely surrounds said bag in a radial direction and limits radial expansion thereof when said bottom wall is moved toward said bag upper end.

4. The dispensing device of claim 3 wherein said bag is formed of a stretchable resilient material for continuously applying pressure on a product therein when said actuator is in a bag collapsing position, and the relative proportions of said bag, said housing surrounding said bag and the magnitude of the movement of said actuator facilitating the resilient stretching of said bag.

5. The dispensing device of claim 4 together with means for locking said actuator in a position with said bag bottom moved toward said bag upper end.

6. A dispensing device for dispensing the contents of containers of the can type having an end unit secured to a body by an upper chime, said dispensing device comprising a housing having attachment means for engaging a container upper chime, a variable volume enclosure carried by said housing, an inlet tube connected to said enclosure for communicating said enclosure with the interior of an associated container, a dispensing valve and nozzle connected to said enclosure for dispensing a product drawn into the enclosure and placed under pressure therein, and an actuator carried by said housing and coupled to said enclosure for varying the volume of said enclosure, said enclosure is in the form of a flexible bag having an upper end fixed relative to said housing and a movable bottom wall, said actuator being connected to said bottom wall for selectively moving said bottom wall away from said bag upper end to elongate said bag and increase the volume thereof and toward said bag upper end to collapse said bag, said actuator including a lever pivotally mounted in said housing and depending therefrom, said lever having latch means thereon remote from said housing for latching engagement with a bottom part of an associated container.

7. The dispensing device of claim 6 wherein said latch means latches said lever in a bag collapsing position.

8. A dispensing device for dispensing the contents of containers of the can type having an end unit secured to a body by an upper chime, said dispensing device comprising a housing having attachment means for engaging a container upper chime, a variable volume enclosure carried by said housing, an inlet tube connected to said enclosure for communicating said enclosure with the interior of an associated container, a dispensing valve and nozzle connected to said enclosure for dispensing a product drawn into the enclosure and placed under pressure therein, and an actuator carried by said housing and coupled to said enclosure for varying the volume of said enclosure, said actuator including a lever pivotally mounted in said housing and depending therefrom, said lever having latch means thereon remote from said housing for latching engagement with a bottom part of an associated container.

9. The dispensing device of claim 8 wherein said latch means latches said lever in an enclosure collapsing position.

* * * * *